(12) United States Patent
Wu et al.

(10) Patent No.: US 9,641,211 B2
(45) Date of Patent: May 2, 2017

(54) MOBILE COMMUNICATION DEVICE WITH ANTENNA

(71) Applicant: PEGATRON CORPORATION, Taipei (TW)

(72) Inventors: Chien-Yi Wu, Taipei (TW); Chi-Min Tang, Taipei (TW); Yu-Yao Chang, Taipei (TW); Hau-Yuen Tan, Taipei (TW); Tse-Hsuan Wang, Taipei (TW); Chao-Hsu Wu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 15/082,607

(22) Filed: Mar. 28, 2016

(65) Prior Publication Data
US 2016/0294430 A1 Oct. 6, 2016

(30) Foreign Application Priority Data

Mar. 31, 2015 (TW) .............................. 104110573 A

(51) Int. Cl.
*H04M 1/00* (2006.01)
*H04B 1/3888* (2015.01)

(52) U.S. Cl.
CPC .................................. *H04B 1/3888* (2013.01)

(58) Field of Classification Search
CPC ....... H01Q 1/243; H01Q 1/242; H04B 1/3833
USPC ...................... 455/575.7, 575.1, 575.5, 550.1
See application file for complete search history.

(56) References Cited

U.S. PATENT DOCUMENTS

2009/0280757 A1* 11/2009 Zhu ...................... H01Q 1/2241
455/114.1
2013/0234910 A1 9/2013 Oh et al.
2014/0125528 A1 5/2014 Tsai et al.
2014/0159984 A1 6/2014 Kato et al.
2016/0064801 A1* 3/2016 Han ....................... H01Q 1/243
343/702

* cited by examiner

*Primary Examiner* — Nghi H Ly
(74) *Attorney, Agent, or Firm* — Muncy, Geissler, Olds & Lowe, P.C.

(57) ABSTRACT

A mobile communication device with an antenna is disclosed. A portion of a metal cover of the mobile communication device can function as an extension of a radiator of the antenna, and the installation of a pair of filters can prevent interference between the low frequency antenna and another antenna. The design of the present invention expands the sensing range of the antenna.

16 Claims, 5 Drawing Sheets

MOBILE COMMUNICATION DEVICE WITH ANTENNA

BACKGROUND

1. Technology Field

The present invention relates to a mobile communication device, especially to a mobile communication device with an antenna.

2. Description of the Related Art

With the rise of the concept of mobile payment, mobile communication devices (such as smart phones) with a near-field communication function have been developed gradually. Disposing an antenna module for near-field communication can allow the mobile communication device to function as a payment instrument. However, because antenna signals can be affected by a metallic shield, the sensing efficiency of the antenna module will be reduced if the entire case of a mobile communication device is made of metal.

FIG. 1 illustrates a partial diagram of a metal backing plate of a conventional mobile communication device with a near-field communication function. To prevent antenna signals from being blocked by the case, a slot 113a (usually made of plastic) is disposed at a non-radiation part 114a of the metal backing plate 11a of the case such that an electromagnetic field induced by the antenna can radiate outward via the slot 113a. Although this design can ameliorate the aforementioned fault, the slot 113a must be small to maintain the overall aesthetic of the metal backing plate 11a. As a result, the sensing range of an antenna disposed inside the case is quite limited (as shown in FIG. 2).

SUMMARY

It is a primary object of the present disclosure to provide a mobile communication device with an antenna.

To achieve the above object, the mobile communication device of the present disclosure includes a case, an antenna and a plurality of filters. The case includes a metal backing plate which comprises a radiation part and a non-radiation part, wherein the radiation part is insulated against the non-radiation part. The antenna is disposed inside the case and includes a first feed point. The filters are electrically connected and disposed between the metal backing plate and the antenna, and each of the filters includes a capacitor and an inductor. One end of each of the capacitors is connected to the antenna, and the other end of each of the capacitors is grounded. Each of the inductors is connected to the capacitor in parallel; one end of each of the inductors is connected to the antenna, and the other end of each of the inductors is connected to the radiation part such that the radiation part of the metal backing plate and the antenna collectively induce a magnetic field when a radio frequency signal is fed from the first feed point.

According to an embodiment of the present disclosure, the non-radiation part of the metal backing plate is grounded, and each of the capacitors is grounded by being electrically connected to the non-radiation part.

According to an embodiment of the present disclosure, the inductor is a wire-wound inductor.

According to an embodiment of the present disclosure, the inductance value of each of the inductors is substantially 91 nH.

According to an embodiment of the present disclosure, the capacitance value of each of the capacitors is substantially 180 pF.

According to an embodiment of the present disclosure, the antenna is a low-frequency coil antenna whose operating frequency is substantially under 16 MHz.

According to an embodiment of the present disclosure, the antenna is a coil antenna for near-field communication.

According to an embodiment of the present disclosure, the number of coils in the coil antenna is 4 to 6.

According to an embodiment of the present disclosure, the mobile communication device of the present invention includes a match circuit, and the antenna further includes a second feed point; the match circuit is connected between the first feed point and the second feed point.

According to an embodiment of the present disclosure, the filters are low pass filters, and the number of the filters is two.

According to an embodiment of the present disclosure, each of the capacitors is disposed at the non-radiation part, and each of the inductors is disposed at the radiation part.

BRIEF DESCRIPTION OF THE DRAWINGS

The exemplary embodiment(s) of the present invention will be understood more fully from the detailed description given below and from the accompanying drawings of various embodiments of the invention, which should not be taken to limit the invention to the specific embodiments but are for explanation and understanding only.

DETAILED DESCRIPTION OF THE PREFERRED EMBODIMENT

Figure 1:
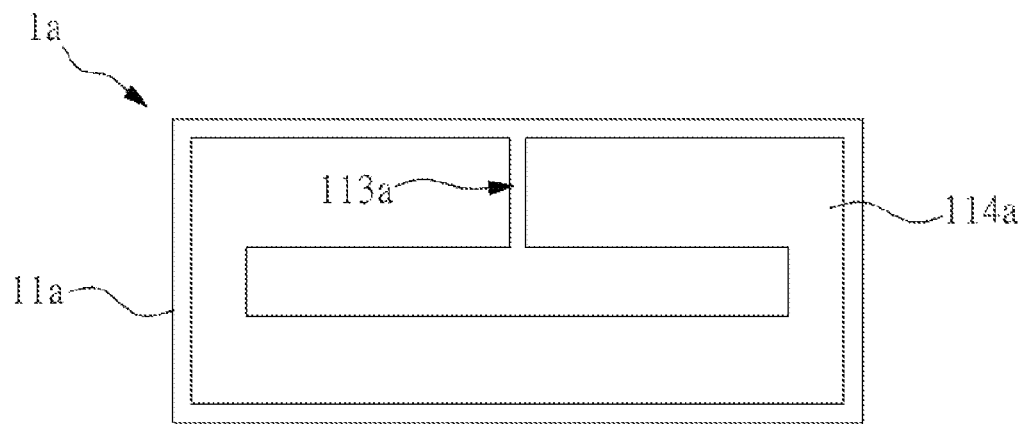
FIG. 1 illustrates a metal case of a conventional mobile communication device with a near-field communication function.
Figure 2:
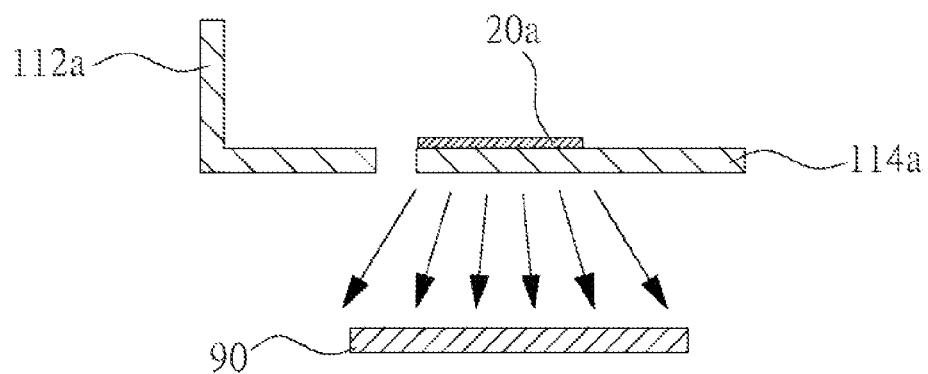
FIG. 2 illustrates a sensing range of a near-field communication antenna of the conventional mobile communication device with a near-field communication function.
Figure 3:
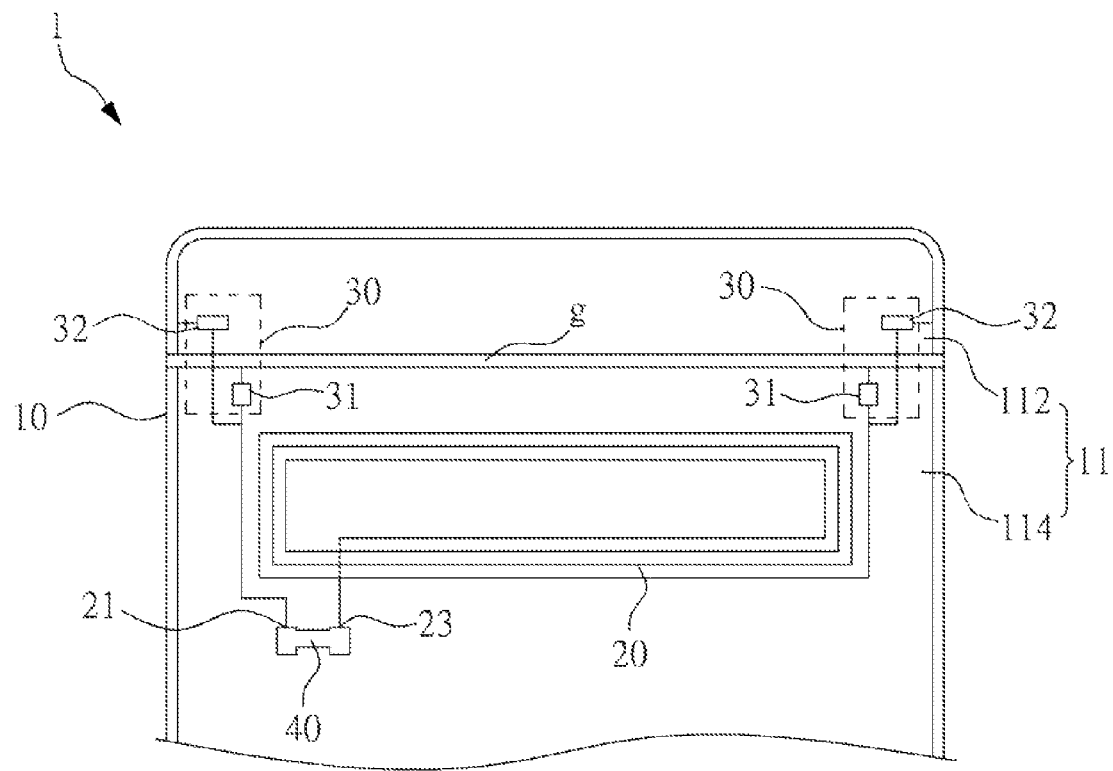
FIG. 3 is a partial schematic diagram of the interior of a mobile communication device with an antenna of the present invention.
Figure 4:
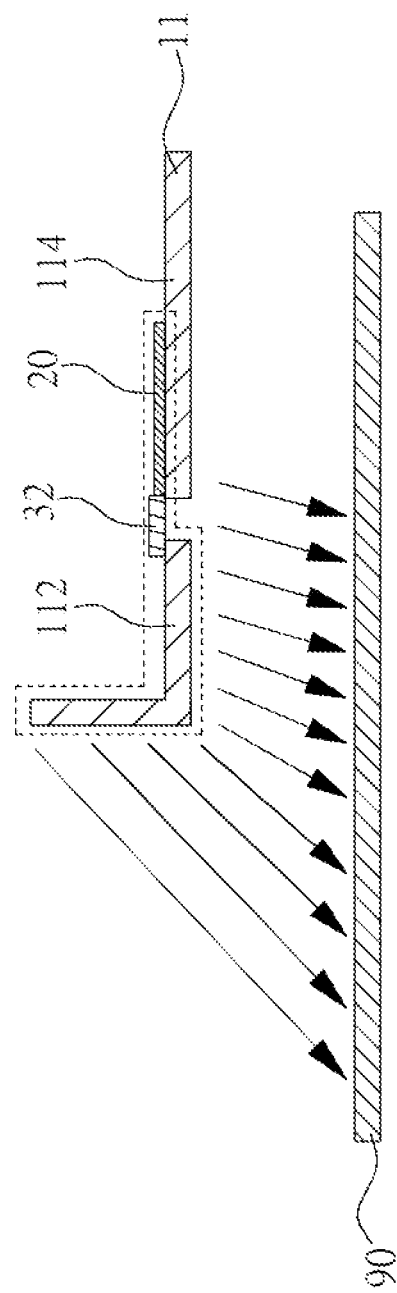
FIG. 4 illustrates the sensing range of a low-frequency antenna of the present invention.
Figure 5:
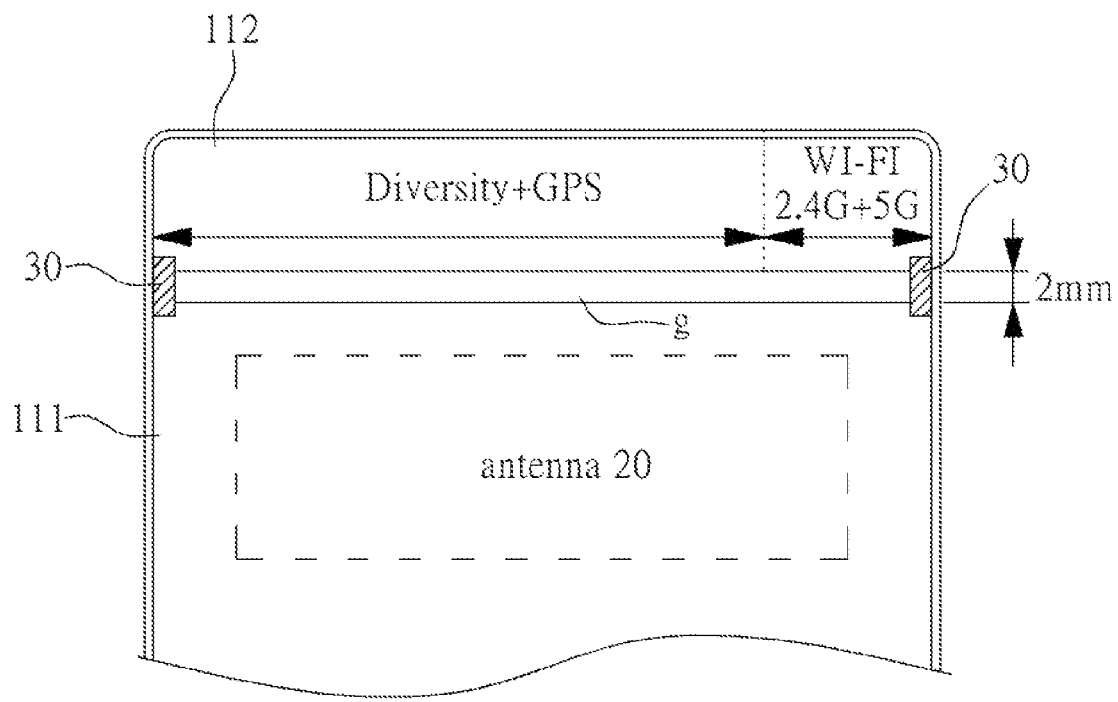
FIG. 5 illustrates the schematic disposition of the antennas of a mobile communication device having three types of antennas.
Figure 6:
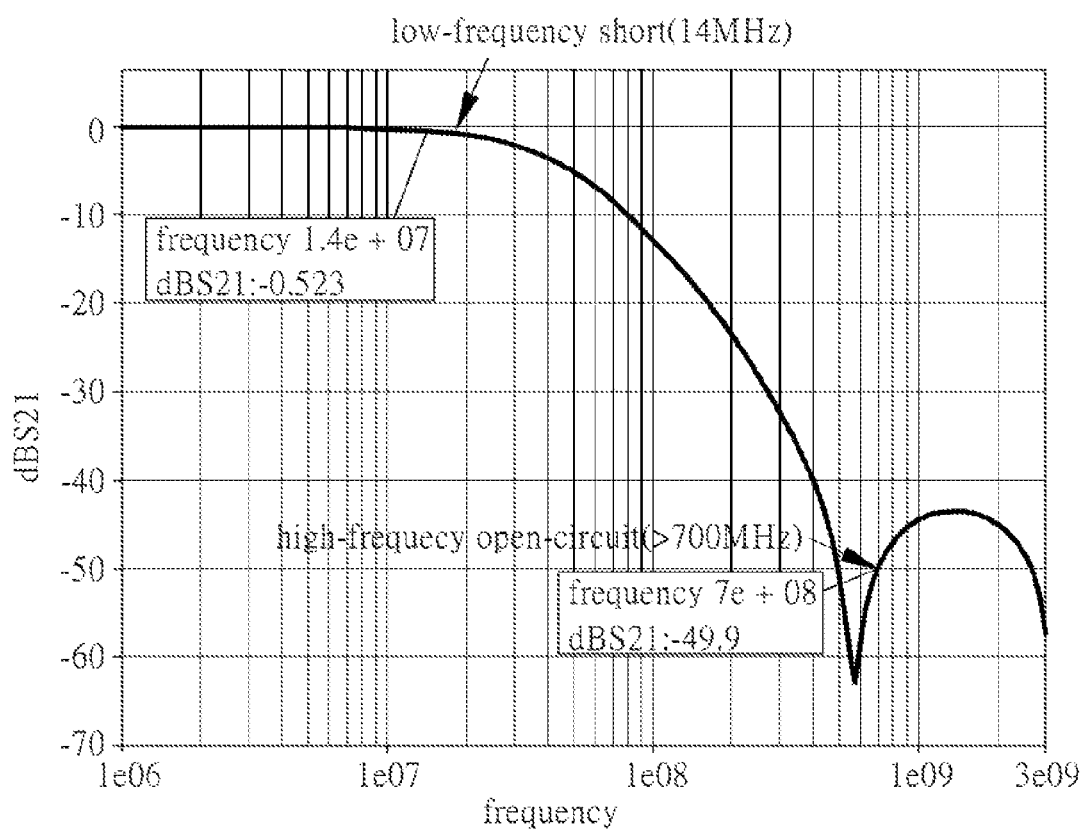
FIG. 6 illustrates an experimental simulation diagram of a circuit of the filter of the present invention.

Please refer to FIG. 3 to FIG. 6. FIG. 3 is a partial schematic diagram of the interior of a mobile communication device with an antenna of the present invention. FIG. 4 illustrates the sensing range of a low-frequency antenna. FIG. 5 illustrates the schematic disposition of the antennas of a mobile communication device with three types of antennas. FIG. 6 illustrates an experimental simulation diagram of a circuit of the filter of the present invention.

As shown in FIG. 3, in one embodiment of the present invention, a mobile communication device 1 of the present invention includes a case 10, an antenna 20, a pair of filters 30 and a match circuit 40. In a specific embodiment of the present invention, the mobile communication device 1 of the present invention is a smart phone, but the present invention is not limited to this embodiment. The mobile communication device 1 may also be a tablet computer or other electronic product with a communication function.

In one embodiment of the present invention, the case 10 is a metal case, and the case 10 includes a metal backing plate 11 and a front cover (not shown), wherein the metal backing plate 11 includes a radiation part 112 and a non-radiation part 114. The non-radiation part 114 is grounded by being electrically connected to a system ground plane (not shown), and the radiation part 112 is insulated against the non-radiation part 114. A specific embodiment of the electrical isolation could be the arrangement of a plastic gap g (measuring about 2 mm) between the radiation part 112 and the non-radiation part 114 to isolate its electrical connection. In a specific embodiment of the present invention, the thickness of the metal backing plate 11 is about 1 mm, but the present invention is not limited to this embodiment.

In one embodiment of the present invention, the antenna 20 is disposed inside the case 10; i.e., the antenna 20 is disposed between the metal backing plate 11 and the front cover. The antenna 20 includes a first feed point 21 and a second feed point 23, and both the first feed point 21 and the second feed point 23 are electrically connected to an antenna control chip (not shown). When a radio frequency signal generated by the antenna control chip is fed via the first feed point 21, the radio frequency signal can be transmitted to the second feed point 23 via the radiation part 112 to form a circuit. In a specific embodiment of the present invention, the antenna 20 is a low-frequency coil antenna having an operating frequency which is substantially under 16 MHz, such as a coil antenna for near-field communication (in which case, the antenna control chip is a near-field communication chip), and the number of coils in the coil antenna is 4 to 6, but the present invention is not limited to this embodiment; the antenna 20 may also be an inductive coil of a wireless charger. In addition, it is noted that the antenna 20 is an applied scheme for a differential signal and that the antenna 20 includes a first feed point 21 and a second feed point 23, but the present invention is not limited thereto; this design of the antenna 20 of the present invention can also be applied to a scheme for a single-end signal, for which case the antenna 20 only needs the first feed point 21.

In one embodiment of the present invention, each of the filters 30 is electrically connected and disposed between the metal backing plate 11 and the antenna 20. Each of the filters 30 includes a capacitor 31 and an inductor 32. One end of each of the capacitors 31 is connected to the antenna 20, and the other end of each of the capacitors 31 is grounded by being connected to the non-radiation part 114 of the metal backing plate 11 (because the non-radiation part 114 is grounded). The capacitors 31 can protect the low-frequency antenna from interference by high-frequency signals. In a specific embodiment of the present invention, the capacitance value of each of the capacitors 31 is 180 pF, but the present invention is not limited to this embodiment. Each of the inductors 32 is respectively connected to each of the capacitors 31 in parallel. One end of each of the inductors 32 is connected to the antenna 20, and the other end of each of the inductors 32 is connected to the radiation part 112 of the metal backing plate 11. The inductors 32 can isolate the electrical connection between the radiation part 112 and the antenna 20 (i.e., the inductors 32 are in an open circuit state at this time) to protect the antenna 20 from interference by high-frequency signals when the high-frequency signals are transmitted to the radiation part 112 of the metal backing plate 11. That is to say, the inductors 32 permit low-frequency antenna signals to be transmitted to the radiation part 112 but do not permit signals induced by a high-frequency antenna (disposed between the radiation part 112 of the metal backing plate 11 and the front cover; details below) to pass. In a specific embodiment of the present invention, the inductance value of each of the inductors 32 is 91 nH, but the present invention is not limited to this embodiment.

In one embodiment of the present invention, a match circuit 40 is electrically connected between the first feed point 21 and the second feed point 23. The match circuit 40 can adjust the resonant frequency induced by the antenna 20 and match the impedance match. In this embodiment, the match circuit 40 includes two capacitors having capacitance values of 82 pF and 4.7 pF respectively (not shown), and the capacitors are connected to each other in parallel, but the match circuit 40 of the present invention is not limited thereto.

As shown in FIG. 3 and FIG. 4 and the above description, the structural design of the mobile communication device 1 of the present invention is such that the radiation part 112 of the metal backing plate 11 can serve as an extended portion of a radiator of a low-frequency antenna; in other words, low-frequency signals fed from the first feed point 21 of the antenna 20 can be transmitted to the second feed point 23 to form a circuit via the radiation part 112 of the metal backing plate 11, and the antenna 20 and the radiation part 112 can collectively induce a magnetic field because of an electromagnetic effect, which not only maintains the aesthetic feeling of the whole appearance of the metal backing plate 11 but also expands the range of the antenna 20 such that the antenna 20 can more easily sense an object to be sensed.

In addition, if the mobile communication device 1 further includes another antenna, such as a Diversity antenna and/or a Wi-Fi antenna, and the antenna also radiates signals by the radiation part 112 of the metal backing plate 11, the filters 30 can prevent the low-frequency antenna from interfering with the other antenna. FIG. 6 illustrates an experimental simulation diagram of a circuit of the filter of the present invention. As shown in FIG. 3, low-frequency signals can pass through the inductors 32 and be transmitted to the antenna 20 when the low-frequency signals are inputted from one end of the inductors 32 of the filters 30. Conversely, when high-frequency signals are inputted from one end of the inductors 32 of the filters 30, the high-frequency signals will be filtered off by the inductors 32 such that the metal backing plate 11 and the antenna 20 substantially function as an open circuit to protect the antenna 20 from high-frequency interference.

In summary, regardless of the function, the method and result of the present invention are shown to have technical characteristics different from those of the prior arts, and said method and result constitute a significant advance in the field. It is hoped that the examiners will appreciate the novelty of the present invention and grant this patent. However, the aforementioned embodiment is just for illustration of the principle and the result of the present invention and should not be construed to limit the range of the present invention. It will be obvious to those skilled in the art that, based upon the content herein, changes and modifications may be made without departing from the spirit and scope of the present invention. Therefore, the appended claims are intended to encompass within their scope all such changes and modifications as are within the true spirit and scope of the exemplary embodiment(s) of the present invention.

What is claimed is:
1. A mobile communication device, comprising:
 a case, comprising a metal backing plate, the metal backing plate comprising a radiation part and a non-radiation part, wherein the radiation part is insulated against the non-radiation part;

an antenna, disposed inside the case and comprising a first feed point;

a plurality of filters, electrically connected and disposed between the metal backing plate and the antenna, each of the filters comprising:

a capacitor, wherein one end of the capacitor of each of the filters is connected to the antenna and the other end of the capacitor of each of the filters is grounded; and an inductor, connected to the capacitor in parallel, wherein one end of the inductor of each of the filters is connected to the antenna and the other end of the inductor of each of the filters is connected to the radiation part such that the radiation part of the metal backing plate and the antenna collectively induce a magnetic field when a radio frequency signal is fed from the first feed point.

2. The mobile communication device as claimed in claim 1, wherein the non-radiation part is grounded, and each of the capacitors is grounded by being electrically connected to the non-radiation part.

3. The mobile communication device as claimed in claim 1, wherein the inductor is a wire-wound inductor.

4. The mobile communication device as claimed in claim 3, wherein the inductance value of each of the inductors is substantially 91 nH.

5. The mobile communication device as claimed in claim 1, wherein the capacitance value of each of the capacitors is substantially 180 pF.

6. The mobile communication device as claimed in claim 1, wherein the antenna is a low-frequency coil antenna having an operating frequency which is substantially under 16 MHz.

7. The mobile communication device as claimed in claim 1, wherein the antenna is a coil antenna of a near-field communication.

8. The mobile communication device as claimed in claim 6, wherein the number of coils in the coil antenna is 4 to 6.

9. The mobile communication device as claimed in claim 7, wherein the number of coils in the coil antenna is 4 to 6.

10. The mobile communication device as claimed in claim 1, further comprising a match circuit, and the antenna further comprising a second feed point; the match circuit is electrically connected between the first feed point and the second feed point.

11. The mobile communication device as claimed in claim 1, wherein the filters are low pass filters, and the number of the filters is two.

12. The mobile communication device as claimed in claim 1, wherein each of the capacitors is disposed at the non-radiation part, and each of the inductors is disposed at the radiation part.

13. The mobile communication device as claimed in claim 1, wherein there is a gap between the radiation part and the non-radiation part, such that the radiation part is insulated against the non-radiation part by the gap.

14. The mobile communication device as claimed in claim 13, wherein the number of the filters is two; one of the filters is disposed at one end of the gap, and the other is disposed at the other end of the gap.

15. The mobile communication device as claimed in claim 13, wherein the gap is thin strip-shaped.

16. The mobile communication device as claimed in claim 6, further comprising a high-frequency antenna having an operating frequency which is substantially over 700 MHz.

* * * * *